US008088869B2

(12) United States Patent
Joseph et al.

(10) Patent No.: US 8,088,869 B2
(45) Date of Patent: Jan. 3, 2012

(54) ORGANOSILOXANE COMPOSITIONS

(75) Inventors: Edouard Joseph, Hofheim (DE); Patrick Vandereecken, Court Saint Etienne (BE); Giuseppina Conti, Houdeng-Goegnies (BE); Robert Bonny, Bierges (BE)

(73) Assignees: Dow Corning Europe SA, Seneffe (BE); Dow Corning GmbH, Wiesbaden (DE)

( * ) Notice: Subject to any disclaimer, the term of this patent is extended or adjusted under 35 U.S.C. 154(b) by 603 days.

(21) Appl. No.: 11/996,383

(22) PCT Filed: Jul. 4, 2006

(86) PCT No.: PCT/EP2006/063840
§ 371 (c)(1),
(2), (4) Date: Jul. 23, 2008

(87) PCT Pub. No.: WO2007/009871
PCT Pub. Date: Jan. 25, 2007

(65) Prior Publication Data
US 2009/0042043 A1    Feb. 12, 2009

(30) Foreign Application Priority Data
Jul. 22, 2005 (GB) .................................. 0515052.9

(51) Int. Cl.
*C08F 283/12*    (2006.01)
(52) U.S. Cl. ......................................... 525/479; 528/32
(58) Field of Classification Search .................. 525/479; 528/32
See application file for complete search history.

(56) References Cited

U.S. PATENT DOCUMENTS 2,483,499 A * 10/1949 Lieber et al. .................... 568/28
3,445,420 A    5/1969  Kookootsedes et al.
3,989,667 A   11/1976  Lee et al.
5,849,832 A   12/1998  Virnelson et al.

FOREIGN PATENT DOCUMENTS

| EP | 0093918 A1 | 11/1983 |
| EP | 0628603 A2 | 12/1994 |
| EP | 0688847 A2 | 12/1995 |
| EP | 1548867 A1 | 6/2005  |

OTHER PUBLICATIONS

Dover Chemical Corp. Catalog (publication date unknown).*
Odian, Principles of Polymerization, 2nd Ed., Wiley-Interscience, (1981) p. 31).*
Data sheet of Cereclor 52 (Date unknown) http://file.seekpart.com/keywordpdf/2010/12/21/201012212561377.pdf.*
English language abstract for EP0093918 extracted from espacenet.com, Jan. 16, 2008.

* cited by examiner

*Primary Examiner* — Kuo-Liang Peng
(74) *Attorney, Agent, or Firm* — Howard & Howard Attorneys PLLC

(57) ABSTRACT

A hot melt sealant/adhesive composition is provided which comprises the following components—Component A. a siloxane polymer composition comprising a) An organopolysiloxane which may comprise not less than two groups selected from i) silicon bonded alkenyl groups or ii) silicon-bonded hydroxyl groups and/or silicon bonded hydrolysable groups b) one or more fillers; and a cure system comprising c) a suitable catalyst and where required d) a suitable cross-linker adapted to react with component (a), catalysed with component (c); and either or both of components B. and C. wherein: —B. is one or more hot melt resins; and C. is one or more waxes having a melt temperature of between 40 and 200° C.; and/or an organic resin having a viscosity average molecular weight of from 200 to 6000 and a softening point of from 0° C. and 150° C.; wherein the total amount of components B and/or C in the composition is from 2 to 60% by weight of the whole composition.

19 Claims, No Drawings

ORGANOSILOXANE COMPOSITIONS

RELATED APPLICATIONS

This application claims priority to and all the advantages of International Patent Application No. PCT/EP2006/063840, filed on Jul. 4, 2006, which claims priority to Great Britain Patent Application No. GB 0515052.9, filed on Jul. 22, 2005.

This invention relates to silicone based reactive hot melt adhesive/sealant compositions and in particular reactive hot-melt adhesives and/or sealants having improved green strength.

Organosiloxane compositions, which cure to elastomeric solids, are well known. Typically, such compositions are obtained by mixing a polydiorganosiloxane having reactive terminal groups, e.g. hydroxy groups or hydrolysable groups, with e.g. a silane cross-linking agent which is reactive with the polydiorganosiloxane, for example an acetoxy silane, an oximosilane, an aminosilane or an alkoxysilane in the presence of a suitable catalyst. The resulting compositions are curable upon exposure to atmospheric moisture at room temperature.

One important application of the above-described curable compositions is their use as adhesives and/or sealants. In use as sealants, it is important that a composition is capable of curing in comparatively thick layers to provide an elastomeric body having a thickness greater than about 2 mm. It is frequently desirable that the organopolysiloxane composition cures quickly enough to provide a sound seal within several hours but not so quickly that the surface cannot be tooled to desired configuration shortly after application. Among specifically desirable attributes for such compositions are fast surface cure rate, good elasticity of the skin formed and lack of surface tackiness after curing for about 24 hours.

In order to achieve the desired speed of cure with hydroxy or hydrolysable polymers using alkoxysilane cross-linkers, it has become general practice to employ tri or tetra alkoxy silanes as cross-linkers in combination with organic tin, zirconium or titanium compounds as condensation reaction catalysts. Titanium and zirconium catalysts most generally preferred are those derived from primary, secondary or tertiary alcohols, for example, isopropyl alcohol t-butyl alcohol and n-butyl alcohol. The titanium and/or zirconium compounds used are often employed in combination with a chelating agent such as an acetyl acetonate as an accelerator and stabilizer for the titanium compound.

However, such a sealant is applied onto a substrate at room temperature and is designed to take at least several hours before the bond between the sealant/adhesive and a substrate reaches its condition of ultimate strength, i.e. they do not cure fast enough immediately after application onto a substrate to form a sufficient green strength for applications requiring strong initial bonds between the sealant/adhesive and the substrate.

It is to be understood that "Green strength" as referred to above is the bond strength prior to completion of chemical cure of the organopolysiloxane component by e.g. reaction with moisture and "Ultimate strength" as discussed henceforth is the adhesive strength after the chemical cure is essentially complete. Standard methods have been determined to measure both green strength and ultimate strength, one of which is ASTM D3163 involving the determination of both maximum or Lap shear strength and % cohesive failure for both green strength and ultimate strength. For green strength, the maximum shear strength values, measured according to ASTM D3163, are recorded only 3 minutes after sealant application to ensure that the chemical cure process is incomplete.

"Hot melt" materials may be reactive or unreactive. Reactive hot melt materials are chemically curable thermoset products which are inherently high in strength and resistant to flow (i.e. high viscosity) at room temperature. Compositions containing reactive or non-reactive hot melt materials are generally applied to a substrate at elevated temperatures (i.e. temperatures greater than room temperature, typically greater than 50° C.) as the composition comprises at least one organic resin constituent which is significantly less viscous at elevated temperatures (e.g. 50 to 200° C.) than at room temperature or thereabouts. Hot melt materials are applied on to substrates at elevated temperatures as flowable masses and are then allowed to quickly "resolidify" merely by cooling. Hot melt resins typically have (midpoint) glass transition points ($T_g$) at temperatures below 0° C. The viscosity of hot melt resins tend to vary significantly with change in temperature from being highly viscous at relatively low temperatures (i.e. at or below room temperature) to having comparatively low viscosities as temperatures increase towards 200° C. The hot melt resins such as, for example, polyisobutylenes may have viscosities of between 10 and 1000 Pa·s at 150° C. whereas, upon cooling, the highly viscous nature returns with the viscosity being typically greater than 5000 Pa·s.

EP0688847 and EP0628603 both describe silicone based hot melt compositions comprising hydroxyl and/or alkoxy functional Silicone resins of the formula:—

$$R_a SiO_{(4-a)/2}.$$

The groups concerned are typically those where a is zero and those where a is 1 In which each R is typically an alkyl group or a hydroxyl group or an alkoxy group. Such silicone resins are both compatible with the siloxane reactive polymer used and have a glass transition temperature ($T_g$) of significantly greater than 100° C., however when mixed with the reactive siloxane polymer the effective value of $T_g$ is reduced to a value between 0 and 50° C. Furthermore if the amount of silicone resin in the siloxane polymer in these prior art documents is reduced to below 50% the hot melt characteristics and effective green strength becomes negligible.

The inventors have surprisingly identified that a superior hot melt behaviour may be successfully obtained via an approach contrary to the above prior art in that the hot melt behaviour is obtained by the introduction of partially miscible organic polymers, having a $T_g$ below room temperature (25° C.) and/or a wax and/or low molecular weight organic resin, into a reactive siloxane polymer composition to provide the composition with an immediate green strength.

In accordance with the present invention there is provided a hot melt sealant/adhesive containing:—

Component A: a siloxane polymer composition comprising
  a) An organopolysiloxane which may comprise not less than two groups selected from
    i) silicon bonded alkenyl groups or
    ii) silicon-bonded hydroxyl groups and/or silicon bonded hydrolysable groups
  b) one or more fillers;
    and a cure system comprising
  c) a suitable catalyst and where required
  d) a suitable cross-linker adapted to react with component (a), catalysed with component (c); and
either or both of components B. and C. wherein:—
  B. is one or more hot melt resins; and
  C. is one or more waxes having a melt temperature of between 40 and 200° C.; and/or an organic resin having a viscosity average molecular weight of from 200 to 6000 and a softening point of from 0° C. and 150° C.;

wherein the total amount of components B and/or C in the composition is from 2 to 60% by weight of the whole composition.

Compositions in accordance with the present invention may be applied onto substrates at relatively low temperatures, when compared to traditional hot melt compositions, preferably in the range of 40 to 200° C. most preferably 40 to 125° C. but are still able to provide the user with an enhanced green strength to the unit faster than traditional chemical cure products thereby combining the best properties of both hot melt and chemically curing technologies into a successful siloxane based sealant/adhesive. The sealant is designed to be applied within the above range of elevated temperatures in the form of a liquid or paste which turns back to a solid immediately upon cooling providing an immediate green strength to the sealant prior to chemical curing of the organopolysiloxane constituent which in time cures to a provide a permanent solid elastomeric sealant/adhesive.

In a composition according to a first aspect of the invention, the organopolysiloxane (a) of siloxane polymer component A is an organopolysiloxane having the general formula J-Q-J which is cured using a condensation cure system. When component A is cured by way of a condensation reaction Q is preferably a polydiorganosiloxane chain containing multiple siloxane units of the formula $R''_s SiO_{4-s/2}$ in which each R" independently represents an alkyl group having from 1 to 10 carbon atoms, an alkenyl group such as vinyl, propenyl and/or hexenyl groups; an aryl group such as phenyl, or a fluorinated alkyl group and s has a value of 0, 1 or 2. Preferred materials are linear materials i.e. s=2 for all units. Preferred materials have polydiorganosiloxane chains according to the general formula —$(R''_2 SiO)_m$— in which each R" represents an alkyl group, for example a methyl, ethyl or isobutyl group and m has a value from about 200 to about 1500. Suitable materials have viscosities in the order of about 500 mPa·s to about 200,000 mPa·s at 25° C. When component A(a) comprises at least two hydroxyl or silicon bonded hydrolysable groups then at least one R" group may alternatively be a hydroxyl group or a hydrolysable group.

When component A(a) comprises at least two hydroxyl or silicon bonded hydrolysable groups, each J of the organopolysiloxane comprises one or more hydroxyl or hydrolysable groups which may be the same or different and may, for example, terminate with one of the following groups, for example, from —$Si(R'')_2 OH$, —$Si(R'')OH_2$, —$SiOH_3$ or

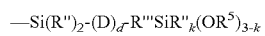
—$Si(R'')_2$-$(D)_d$-$R'''SiR''_k(OR^5)_{3-k}$ where D is —$R'''$—$(Si(R'')_2$—$O)_r$—$Si(R'')_2$— and R" is as aforesaid, (and is preferably methyl), R'" is a divalent hydrocarbon group r is a whole number between 1 and 6 and d is 0 or a whole number, most preferably d is 0, 1 or 2, $R^5$ is an alkyl or oxyalkyl group in which the alkyl groups have up to 6 carbon atoms and k has the value 0, 1 or 2. Preferably, R'" is either a methylene or ethylene group k is 0 or 1 and $R^5$ is a methyl or ethyl group. For example a j group may be terminated with a group wherein R'" is an ethylene group k is 0 and $R^5$ is an ethyl group. A small proportion of J groups may be (alkyl)$_3$Si— terminated groups (where the alkyl groups are preferably methyl groups). Preferably, the organopolysiloxane (component A(a)) will comprise from 32 to 70 weight % of the composition.

In a composition according to a second aspect of the invention, the organopolysiloxane (a) of siloxane polymer component A is an organopolysiloxane having the general formula J-Q-J which is cured using a hydrosilylation cure system. When component A is cured by way of a hydrosilylation reaction Q is preferably a polydiorganosiloxane chain containing multiple siloxane units of the formula $R''_s SiO_{4-s/2}$ in which each R" is as hereinbefore described and s has a value of 0, 1 or 2. Preferred materials are linear materials i.e. s=2 for all units. Preferred materials have polydiorganosiloxane chains according to the general formula —$(R_2 SiO)_m$— in which each R" represents an alkyl group, for example a methyl, ethyl or isobutyl group and m has a value from about 200 to about 1500. Suitable materials have viscosities in the order of about 500 mPa·s to about 200,000 mPa·s at 25° C.

Preferably when component A is cured via a hydrosilylation reaction each group J contains at least one Si-alkenyl bond wherein the or each alkenyl group may be the same or different but is as hereinbefore described. Most preferably each alkenyl group is a vinyl group. Examples include alkenyldialkyl silyl terminated groups such as vinyldimethyl silyl, vinyldiethyl silyl, allyldimethyl silyl and hexenyldimethylsilyl groups.

In a composition according to a third aspect of the invention, the organopolysiloxane (a) of siloxane polymer component A is an organopolysiloxane cured via a free radical cure system in which case Q is preferably a polydiorganosiloxane chain containing multiple siloxane units of the formula $R''_s SiO_{4-s/2}$ in which each R" is as hereinbefore described and s has a value of 0, 1 or 2. Preferred materials are linear materials i.e. s=2 for all units. Preferred materials have polydiorganosiloxane chains according to the general formula —$(R''_2 SiO)_m$— in which each R" represents an alkyl group, for example a methyl, ethyl or isobutyl group and m has a value from about 200 to about 1500. Suitable materials have viscosities in the order of about 500 mPa·s to about 200,000 mPa·s at 25° C. In free-radical cured system each J group preferably either comprises an Si—alkenyl group wherein the or each alkenyl group may be the same or different but is as hereinbefore described. Most preferably each alkenyl group is a vinyl group. Examples include alkenyldialkyl silyl terminated groups such as those described above. Alternatively each J group may be trialkylsilyl terminated in which each alkyl group may be the same or different.

The one or more fillers (Component A(b)) may comprise any one or more suitable fillers which may be either reinforcing and/or non-reinforcing fillers or a combination thereof. Reinforcing fillers are usually of small particle size and typically are surface active in that they contain reactive groups on their outer surface. Examples of reinforcing fillers include fumed silica, calcined silica, precipitated silica, titania, zinc oxide, clay and mica all of which are used for imparting mechanical strength to the resulting cured products. Non-reinforcing fillers include ground calcium carbonate, magnesium carbonate, quartz, diatomaceous earth, barium sulphate, wollastonite, pyrophylite, kaolin and calcium sulphate. It is also to be noted that some fillers, such as precipitated calcium carbonate, can be considered as semi-reinforcing in that they provide compositions with a degree of reinforcement. The fillers may be pretreated or treated in-situ with treating agents such as organochlorosilanes, organopolysiloxanes, and hexaalkyldisilazanes or alternatively may be treated with fatty acids or their derivatives. Optionally the treating agent may contain a degree of unsaturation.

In the present invention whilst any of the above fillers may be utilized precipitated calcium carbonates are preferred, particularly those treated with fatty acids or their derivatives. Preferably, component A(b) will be present in the composition in a range of from 2 to 180 parts by weight, per 100 parts by weight of component A(a) dependent on the filler used. In the case of calcium carbonate, for example, the amount of filler used will be in the range of from 40 to 180 parts by weight, per 100 parts by weight of component A(a), i.e. it will be present in the region of from 28 to 60 weight % of the composition and in the case of silica based fillers the filler is more likely to be within the range of from 2 to 22 parts by weight, per 100 parts by weight of component A(a).

Component A of the composition additionally comprises a cure system comprising a suitable catalyst and where required across-linker. For the first aspect of the invention where component A is cured via a condensation route the cure system comprises component A (c) a condensation catalyst, provided to catalyse the reaction between component A(a) and a cross-linker component A(d) as described below.

Any suitable condensation catalyst A(c) may be utilised to cure the composition in accordance with the first aspect of the invention. These may include condensation catalysts containing metals such as tin, lead, antimony, iron, cadmium, barium, manganese, zinc, chromium, cobalt, nickel, aluminium, gallium or germanium and zirconium. Examples include organic tin metal catalysts such as alkyltin ester compounds such as Dibutyltin dioctoate, Dibutyltin diacetate, Dibutyltin dimaleate, Dibutyltin dilaurate, butyltin 2-ethylhexoate. 2-ethylhexoates of iron, cobalt, manganese, lead and zinc may alternatively be used but titanate and/or zirconate based catalysts are preferred. Such titanates may comprise a compound according to the general formula $Ti[OR]_4$ where each R may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of R include but are not restricted to methyl, ethyl, propyl, isopropyl, butyl, tertiary butyl and a branched secondary alkyl group such as 2,4-dimethyl-3-pentyl. Preferably, when each R is the same, R is an isopropyl, branched secondary alkyl group or a tertiary alkyl group, in particular, tertiary butyl.

Alternatively, the titanate may be chelated. The chelation may be with any suitable chelating agent such as an alkyl acetylacetonate such as methyl or ethylacetylacetonate. The catalyst may therefore comprise a mixture or reaction product of $$M(OR)_4 \text{ or} \qquad (i)$$

$$M(OR')_x(Z)_z \qquad (ii)$$

wherein M is titanium or zirconium, each R' is the same or different and is a primary, secondary or tertiary aliphatic carbon groups or $-SiR^9_3$, in which each $R^9$ is an alkyl group having from 1 to 6 carbon atoms;
Z is a group of the formula $-O-Y-O-$ wherein Y is an optionally branched alkylene group comprising from 1 to 8 carbon atoms; and
x is 0 or 2, wherein when x is 0, z is 2 and when x is 2, z is 1; with
(iii) a compound having the general formula:

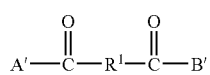

In which
$R^1$ is an optionally substituted alkylene radical having from 1 to 6 carbon atoms, A' is selected from the group consisting of:
(!) $-(CX_2)_nC(R^2)_3$ wherein n is from 0 to 5,
(!!) an adamantyl group and
(!!!) an adamantyl derivative;
B' is selected from the group consisting of:
a") $-(CX_2)_tC(R^2)_3$, wherein t has a value of from 0 to 5,
b") a monovalent alkyl group having from 1 to 6 carbon atoms, and
c") $OR^3$, wherein $R^3$ is selected from (a") or (b")
each X is the same or different and is a halogen group or hydrogen;
each $R^2$ is the same or different and is X or an alkyl radical having one to eight carbon atoms These materials are produced, for example, by reacting an alcoholate as referred to above with an α- or β-diketone or a derivative thereof. More preferred are those partially chelated titanium compounds having two alcoholate groups attached to titanium. The most preferred organotitanium compounds are those wherein the two alcoholate groups are composed of more than 3 carbon atoms, for example, bis(diethyleneglycoxy)-titanium-(2,4-pentanedionate).

When Z is $-O-Y-O-$ each oxygen atom is bound directly to the titanium atom and x is about 2. Preferably Y is an alkylene group containing 1 to 8 carbon atoms. Examples of the $O-Y-O$ group may include 1,3-dioxypropane $(O-(CH_2)_3-O)$, 2,4-dimethyl-2,4-dioxypentane $(O-C((CH_3)_2)-CH_2-C((CH_3)_2)-O)$ and 2,3-dimethyl-2,3-dioxybutane $(O-C((CH_3)_2)-C-((CH_3)_2)-O)$ Regarding now compound (iii), preferably at least one and most preferably each X is a halogen radical. Most preferably the halogen radical is a fluorine radical. Similarly it is preferred that at least one and most preferably each $R^2$ group is a halogen radical and most preferably it is a fluorine radical or each $R^2$ group is an alkyl group, most preferably a methyl or ethyl or butyl group. In a most preferred formulation n is zero. $R^1$ is most preferably a methylene group but can have one alkyl or halogen substituted alkyl group with 1 to 5 carbon atoms. The adamantyl group is a derivative of adamantane or tricyclo-3,3,1,1-decane which is a rigid ring system based on three fused cyclohexane rings.

Examples of compound (iii) include Methyl pivaloylacetate (MPA) and Ethyl 4,4,4-trifluoroacetoacetate (TFA)

Preferably the catalyst, component A(c), will be present in an amount of from 0.3 to 6 parts by weight per 100 parts by weight of component A(a), i.e. from about 0.2 to 2 weight % of the composition. Component A(c) may be present in an amount of greater than 6 parts by weight in cases where chelating agents are used.

In accordance with the second aspect of the invention, component A is cured by way of a hydrosilylation reaction in which a hydrosilylation catalyst catalyses the reaction between a polymer having Si-alkenyl groups and a cross-linker comprising Si—H bonds component A(d), discussed below.

Preferably the hydrosilylation catalyst chosen may comprise any suitable hydrosilylation catalyst such as a platinum group metal based catalyst selected from a platinum, rhodium, iridium, palladium or ruthenium catalyst. Platinum group metal containing catalysts useful to catalyse curing of the present compositions can be any of those known to catalyse reactions of silicon bonded hydrogen atoms with silicon bonded alkenyl groups. The preferred platinum group metal for use as a catalyst to effect cure of the present compositions by hydrosilylation is a platinum based catalyst. Some preferred platinum based hydrosilylation catalysts for curing the present composition are platinum metal, platinum compounds and platinum complexes. Representative platinum compounds include chloroplatinic acid, chloroplatinic acid hexahydrate, platinum dichloride, and complexes of such compounds containing low molecular weight vinyl containing organosiloxanes. Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4{}_3[(R^3)_2S]_3$, $(R^2{}_3P)_2Rh(CO)X^4$, $(R^2{}_3P)_2Rh(CO)H$, $Rh_2X^4{}_2Y^2{}_4$, $H_aRh_b olefin_c Cl_d$, $Rh(O(CO)R^3)_{3-n}(OH)_n$ where $X^4$ is hydrogen, chlorine, bromine or iodine, $Y^2$ is an alkyl group, such as methyl or ethyl, CO, $C_8H_{14}$ or 0.5 $C_8H_{12}$, $R^3$ is an alkyl radical, cycloalkyl radical or aryl radical and $R^2$ is an alkyl radical an aryl radical or an oxygen substituted radical, a is 0 or 1, b is 1 or 2, c is a whole number from 1 to 4 inclusive and d is 2, 3 or 4, n is 0 or 1. Any suitable iridium catalysts such as $Ir(OOCCH_3)_3$, $Ir(C_5H_7O_2)_3$, $[Ir(Z^4)(En)_2]_2$, or $(Ir(Z^4)(Dien)]_2$, where $Z^4$ is chlorine, bromine, iodine, or alkoxy, En is an olefin and Dien is cyclooctadiene may also be used.

The hydrosilylation catalyst may be added to the present composition in an amount equivalent to as little as 0.001 part by weight of elemental platinum group metal, per one million parts (ppm) of the composition. Preferably, the concentration of the hydrosilylation catalyst in the composition is that capable of providing the equivalent of at least 1 part per million of elemental platinum group metal. A catalyst concentration providing the equivalent of about 3-50 parts per million of elemental platinum group metal is generally the amount preferred.

In a third aspect of the present invention component A is cured by a free-radical reaction process catalysed by a free radical catalyst Component A (c) without the need for across linker. The free radical catalyst is preferably an organic peroxide such as dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, tertiary-butyl-trimethyl peroxide, tertiary-butyl-tertiary-butyl-tertiary-triphenyl peroxide, 1,1-bis(t-butylperoxy)-3,3,5-trimethylcyclohexane, and t-butyl perbenzoate. The most suitable peroxide based curing agents are benzoyl peroxide, 2,4-dichlorobenzoyl peroxide, di-t-butyl peroxide, and dicumyl peroxide. Such organic peroxides are used at up to 10 parts per 100 parts of the combination of polymer, filler and optional additives. Preferably between 0.2 and 2 parts of peroxide are used.

For the first aspect of the invention, where component A is condensation cured, component A(d) is a suitable silane or short chain organopolysiloxane comprising at least two and preferably three or more hydroxyl and/or otherwise hydrolysable groups which are reactable with component A(a). The hydrolysable groups in Component A(d) may comprise acyloxy groups (for example, acetoxy, octanoyloxy, and benzoyloxy groups); ketoximino groups (for example dimethyl ketoximo, and isobutylketoximino); alkoxy groups (for example methoxy, ethoxy, an propoxy) and alkenyloxy groups (for example isopropenyloxy and 1-ethyl-2-methylvinyloxy).

In the case of siloxane based cross-linkers the molecular structure can be straight chained, branched, or cyclic.

When the crosslinker is a silane and when the silane has three silicon-bonded hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Hence, component A(d) in the first aspect of the invention may comprise a silane substantially having the formula $G_x$-Si—$R_{4-x}$. Each group G may be the same or different and is reactable with the hydroxyl or hydrolysable groups. Examples of preferred G groups may be selected from the group of alkoxy, acetoxy, oxime and hydroxy groups as described above. Most preferably the reactable groups are alkoxy groups containing between 1 and 10 carbon atoms such as methoxy, ethoxy, propoxy, isopropoxy, butoxy, and t-butoxy groups. Each R group is the same or different and independently represents an alkyl group having from 1 to 10 carbon atoms, an alkenyl group, an alkynyl group an aryl group such as phenyl, or a fluorinated alkyl group. Preferably, the R group is selected from an alkyl, a linear or branched alkenyl group such as vinyl, propenyl isopropenyl and hexenyl groups or alkynyl group. Preferably x is 2, 3 or 4

Silanes and siloxanes which can be used as crosslinkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methyl ethyl ketoximo)silane, vinyl-tris-methylethyl ketoximo)silane, methyltris(methylethylketoximino) silane, methyltris(isopropenoxy)silane, vinyltris(isopropenoxy)silane, ethyl polysilicate, n-propylorthosilicate, ethylorthosilicate, dimethyltetraacetoxydisiloxane, alkenyl alkyl dialkoxysilanes such as vinyl methyl dimethoxysilane, vinyl ethyldimethoxysilane, vinyl methyldiethoxysilane, vinylethyldiethoxysilane, alkenylalkyldioximosilanes such as vinyl methyl dioximosilane, vinyl ethyldioximosilane, vinyl methyldioximosilane, vinylethyldioximosilane, alkenylalkyldiacetoxysilanes such as vinyl methyl diacetoxysilane, vinyl ethyldiacetoxysilane, vinyl methyldiacetoxysilane, vinylethyldiacetoxysilane and alkenylalkyldihydroxysilanes such as vinyl methyl dihydroxysilane, vinyl ethyldihydroxysilane, vinyl methyldihydroxysilane, vinylethyldihydroxysilane. The cross-linker used may also comprise any combination of two or more of the above.

A sufficient amount of component A(d) in the first aspect is employed to ensure adequate stability of the composition during storage and adequate inter-reaction with component A(a) of the composition when exposed to atmospheric moisture. Preferably component A(d) will be present in a range of from 2 to 22 parts by weight per 100 parts by weight of component A(a), i.e. it will typically comprise from 1.4 to 7.1 weight % of the composition. Most preferably, component A(d) is present in an amount of from 4 to 10 parts by weight per 100 parts by weight of component A(a).

Preferably in the first aspect of the invention Component A compositions in accordance with the present invention comprise:
100 parts by weight of component A(a)
from 2 to 22 parts by weight of component A(d),
from 2 to 180 parts by weight of component A(b), and
from 0.3 to 6 parts by weight of component A(c)

In the second aspect of the invention component A(d) comprise an organohydrogensiloxane having an average of greater than two silicon bonded hydrogen atoms per molecule and a viscosity of up to about 10 Pa·s at 25° C. The organohydrogensiloxane which functions as a cross-linker contains an average of at least two silicon-bonded hydrogen atoms per molecule, and no more than one silicon-bonded hydrogen atom per silicon atom, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cycloalkyls such as cyclohexyl; and aryls such as phenyl and tolyl. Such materials are well known in the art. The molecular structure of the organohydrogensiloxane may be linear, linear including branching, cyclic, or network-form or mixture thereof. There are no particular restrictions on the molecular weight of the organohydrogensiloxane, however it is preferable that the viscosity at 25° C. be 3 to 10,000 mPa·s. Furthermore, the amount of component A(d) in the second aspect of the invention added to the composition is an amount such that the ratio of the number of moles of hydrogen atoms bonded to silicon atoms to the number of moles of alkenyl groups bonded to silicon atoms is in the range of 0.5:1 to 20:1, and preferably in the range of 1:1 to 5:1. If this molar ratio is less than 0.5, curing of the present composition becomes insufficient, while if this molar ratio exceeds 20 hydrogen gas is evolved so that foaming occurs.

The silicon-bonded organic groups present in the organohydrogensiloxane can include substituted and unsubstituted alkyl groups of 1-4 carbon atoms that are otherwise free of ethylenic or acetylenic unsaturation. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Other ingredients, which may be included in the compositions, are pigments, extenders and/or plasticisers, photoinitiators, rheological additives for improving toolability of the composition, such as silicone glycols and adhesion promoters, for example, γ-aminopropyltriethoxysilane alone or in combination with γ-glycidoxypropyltrimethoxysilane. Other optional additives may include Heat stabilizers, Flame retardants, UV stabilizers, Chain extenders, electrically and/or heat conductive fillers, Fungicides and/or biocides and the like (which may suitably by present in an amount of from 0 to 0.3% by weight), water scavengers, (typically the same compounds as those used as cross-linkers or silazanes). It will be appreciated that some of the additives are included in more than one list of additives. Such additives would then have the ability to function in all the different ways referred to.

Extenders and/or plasticisers are provided as optional ingredients to reduce the modulus of the cured elastomer. Examples include a polydimethyl siloxane having terminal triorganosiloxy groups wherein the organic substituents are e.g. methyl, vinyl or phenyl or combinations thereof. Such polydimethylsiloxanes normally have a viscosity of from about 100 to about 100,000 mPa·s at 25° C. and can be employed in amounts up to about 80 parts per 100 parts by weight of the polymeric material. Alternative plasticisers may include organic plasticisers, which will be well known to the person skilled in the art, for example, petroleum distillates such as linear or branched mono unsaturated hydrocarbons such as linear or branched alkenes or mixtures thereof containing at least 12, e.g. from 12 to 25 carbon atoms; and/or mineral oil fractions comprising linear (e.g. n-paraffinic) mineral oils, branched (iso-paraffinic) mineral oils, cyclic (referred in some prior art as naphthenic) mineral oils and mixtures thereof.

In the second aspect of the invention hydrosilylation cure systems may require a catalyst inhibitor to prevent early cure during storage. Any suitable platinum group type inhibitor may be used. One useful type of platinum catalyst inhibitor is described in U.S. Pat. No. 3,445,420, which is hereby incorporated by reference to show certain acetylenic inhibitors and their use. A preferred class of acetylenic inhibitors are the acetylenic alcohols, especially 2-methyl-3-butyn-2-ol and/or 1-ethynyl-2-cyclohexanol which suppress the activity of a platinum-based catalyst at 25° C. A second type of platinum catalyst inhibitor is described in U.S. Pat. No. 3,989,667, which is hereby incorporated by reference to show certain olefinic siloxanes, their preparation and their use as platinum catalyst inhibitors. A third type of platinum catalyst inhibitor includes polymethylvinylcyclosiloxanes having three to six methylvinylsiloxane units per molecule.

Preferably Component A. is a siloxane polymer composition comprising
 a) an organopolysiloxane having not less than two silicon-bonded hydroxyl or hydrolysable groups
 b) one or more fillers
 c) a suitable condensation catalyst for curing component A and
 d) a silane substantially having the formula $G_x$-Si—$R_{4-x}$, wherein each group G is the same or different and is reactable with the hydroxyl or hydrolysable groups in (a), each R independently represents an alkyl group having from 1 to 10 carbon atoms, an alkenyl group, an alkynyl group an aryl group such as phenyl, or a fluorinated alkyl group and x is 2, 3 or 4.

Component B, the hot melt resin may be any suitable hot melt resin. In accordance with the scope of this invention it should be understood that a hot melt resin is defined as a resin having a $T_g$ of less than 25° C., preferably less than 0° C. Such resins are significantly less viscous at temperatures between 50 to 200° C. than at room temperature or thereabouts, such that compositions in accordance with the present invention are flowable masses at temperatures at temperatures between 50 to 200° C. but quickly "resolidify" merely by cooling. Hot melt resins in accordance with the present invention have high molecular weights (e.g. they may have a viscosity average molecular weight of greater than 10 000 and preferably between 20 000 and 200 000) The viscosity of suitable hot melt resins vary significantly with change in temperature from being highly viscous at relatively low temperatures (i.e. at or below room temperature) to having comparatively low viscosities as temperatures increase towards 200° C. e.g. the hot melt resins polyisobutylenes may have viscosities of between 10 and 1000 Pa·s at 150° C. whereas at room temperature the viscosity is typically greater than 5000 Pa·s. This change in viscosity during cooling supplies the composition in accordance with the present invention with a significantly increasing green strength as the composition progressively cools to room temperature.

Examples for Component B include but are not restricted to one or more of the following, and their derivatives, polyolefins such as polyethylenes, polypropylenes, polybutylenes and polyisobutylenes, polyvinyl acetate, hydrocarbon resins, hydrogenated aromatic pure monomer hydrocarbon resins, including aromatic pure styrene hydrocarbon resins, asphalts, bitumens, paraffins, crude rubbers, fluorinated rubbers, fluorocarbons, polystyrenes, cellulosic resins, acrylic resins, styrene butadiene resins, polyterpenes, ethylene propylene diene monomer (EPDM), and mixtures and/or derivatives thereof. However preferably the hot melt resin is a polyolefin, most preferably a polyisobutylene or derivative thereof. Component B, the hot melt resin may be either reactive or unreactive with the constituents of component A but are preferably unreactive therewith Component C, may comprise any suitable wax or combination of waxes having melting points between 40 and 200° C. Suitable waxes include but are not restricted to one or more of montanic acid esters, esters of montanic acid with multifunctional alcohols, partly saponified bright ester waxes Montan wax, micronised and non-micronised polyalkylene waxes such as polyethylene and/or polypropylene based waxes, oxidised polyethylene waxes, micronised amide waxes, waxes comprising esters of monofunctional alcohols, saponified and/or partially saponified waxes, mixed esters of montan wax, cetyl palmitate, linear and/or branched long chain (greater than 15 carbons) 1-alkene based waxes, micronised polyethylene waxes, ethylene homopolymer waxes, ethylene copolymer waxes, partially saponified montanic ester waxes, ethyl vinyl acetate modified polyethylene waxes polypropylene waxes and modified polypropylene waxes, Montan wax acids, esters of ethanediol, and/or glycol montanate. The wax may additionally comprise a blend and/or reaction product of any one of the above with a suitable siloxane or derivative thereof, such as a trialkyl terminated polydialkylsiloxane, or a methylhydrogensiloxane or derivatives thereof. Component C, the wax or combination of waxes, may be either reactive or unreactive with the constituents of component A but are preferably unreactive therewith.

Typically the resins of component C comprise any suitable organic resin which has a molecular weight (viscosity average molecular weight) of from 200 to 6000. (i.e. a weight average molecular weight ($M_w$) of up to about 5000) and a softening point (Ring & Ball method: ASTM D36) between 0° C. and 150° C. and preferably between 25° C. and 150° C. Because of their low molecular weights, these resins have no glass transition temperature which clearly distinguishes them from the resins as described above in component B. Any suitable low molecular weight resin may be utilised as component C either alone or in combination with a suitable wax defined above. Examples of low molecular weight resins include but are not restricted to aliphatic and/or aromatic hydrogenated hydrocarbon resins, aliphatic and/or aromatic pure monomer hydrocarbon resins, polyalkylene resins such as polyethylenes and polypropylene and aromatic pure styrene hydrocarbon resins. Examples of suitable low molecular weight resins for component C include KRISTALEX® F85 (weight average molecular weight=1050, softening point=86° C.), PICOTEX® TM75 (weight average molecular weight=1100, softening point=75° C.) and REGALITE® R1100 (weight average molecular weight=900, softening point=100° C.) all of which are sold by Eastman.

Also included within the scope of this invention are the cured elastomeric products of the said compositions and the use of such compositions for sealing joints, cavities and the like and as adhesive for material assembly.

The moisture curable composition in accordance with the first aspect of the invention may be prepared by mixing the constituents in any suitable order. In a first preferred method component A may be first prepared by the following route:—

A slurry of components A(d) and A(c) may be initially prepared, incorporating optional additives such as an adhesion promoter. The slurry may then be mixed with a proportion, typically between 40 and 75%, of the polymer (component A(a) or an initial mixture of A(a) and plasticiser (when the latter is required)), before the addition of and mixing with the filler (component A(b)) and subsequently the remainder of the polymer. Component B and C are then introduced as hot low viscosity fluid (compared to room temperature viscosities thereof) and mixed into component A until there is a homogeneous or substantially homogeneous mixture of the three components, which will solidify upon the cooling of the composition.

Alternatively, in a condensation cure system in accordance with the first aspect of the present invention, component B, the or each hot melt resin and/or component C e.g. wax is/are heated and then introduced as a hot low viscosity fluid (compared to room temperature viscosities thereof) into the majority of component A(a) the organopolysiloxane polymer or an initial mixture of A(a) and plasticiser (when the latter is required) and mixed until homogeneous, subsequent to which the component A(b) is introduced and mixed into the mixture. Finally a premix containing the remaining component A(a), component A(d), the cross-linker and A(c) the catalyst together with additives such as adhesion promoters are added to complete the composition.

In a still further alternative method for use with a condensation cure system in accordance with a first aspect of the present invention component A(b) is introduced into the majority of component A(a) the organopolysiloxane polymer or an initial mixture of A(a) and plasticiser (when the latter is required) and mixed until homogeneous. A premix containing the remaining component A(a), component A(d), the cross-linker and A(c) the catalyst together with additives such as adhesion promoters is then added to complete Component A. Finally component B, the or each thermoplastic hot melt polymer and/or component C the wax is/are introduced as hot low viscosity fluid (compared to room temperature viscosities thereof introduced into component A and mixed to homogeneity.

In each of the above 3 alternative methods components B and/or C are introduced into the mixture at temperatures of between 40 and 200° C. Furthermore, when both present, components B and C may be introduced either sequentially or simultaneously. The mixture may be degassed to remove oxygen and/or moisture from the atmosphere immediately prior to and or after introduction of the premix containing the remaining component A(a), component A(d), the cross-linker and A(c) the catalyst together with additives such as adhesion promoters is added.

Whilst compositions according to the invention are preferably formulated as one part formulations which are stable in storage but cure on exposure to atmospheric moisture, a major advantage over several prior art products. However, the composition may also be provided in two parts which are intermixed shortly before application and subsequent cure.

The hot melt sealant/adhesive according to the present invention comprising component B provides chemically curable thermoset products with inherently high strength and resistance to flow at room temperature. The Reactive hot melt sealant/adhesive according to the present invention is applied on to a substrate at elevated temperatures (i.e. temperatures greater than room temperature, typically greater than 50° C.) as the composition comprises component B which is significantly less viscous at elevated temperatures (e.g. 50 to 200° C.) than at room temperature or thereabouts. The Reactive hot melt sealant/adhesive according to the present invention is preferably applied on to substrates at a temperature of between 50 and 200° C. as a flowable mass and is then allowed to quickly "resolidify" merely by cooling. Upon cooling the highly viscous nature returns and supplies the composition in accordance with the present invention with a significantly increased initial green strength than it would otherwise achieve. One major advantage of the present invention is that the hot melt character of the composition due to the effects of components B and C are observed with only a few percent (2%-15%) of polymer/waxes Similarly, the inventors have found that a reactive hot melt sealant/adhesive according to the present invention containing component C in the absence of component B also provides a chemically curable thermoset product with inherently high strength and resistance to flow at room temperature. The Reactive hot melt sealant/adhesive according to the present invention is applied on to a substrate at elevated temperatures (i.e. temperatures greater than room temperature, typically greater than 50° C.) as the composition comprises component C which "melts" at an elevated temperatures, typically between 40 to 200° C., but preferably between 40 and 150° C. The Reactive hot melt sealant/adhesive according to the present invention containing component C and not component B is preferably applied on to substrates at a temperature of between 40 and 200° C. as a flowable mass and is then allowed to quickly "resolidify" merely by cooling. Upon cooling the highly viscous nature returns and supplies the composition in accordance with the present invention with a significantly increased initial green strength than it would otherwise achieve.

Surprisingly the inventors have found that by introducing components B and C together into the composition in accordance with the present invention the green strength of the resulting sealant/adhesive upon cooling after application is significantly enhanced when compared to the result for sealants/adhesives containing either one of components B or C.

As soon as the moisture curable organosiloxane in the hot melt sealant/adhesive of the present invention is exposed to moisture/the atmosphere it begins to cure by reaction with atmospheric moisture to form a cross-linked substantially thermoset elastomer which is temperature and solvent resistant. Once the latter has fully cured components B and/or C function as inert secondary plasticisers or extenders within the cured sealant/adhesive.

The enhanced speed of obtaining a sufficient green strength enables, in turn, faster product assembly and therefore shorter production cycles when the sealant is being used in a production line type situation and is effectively one of the major time determining steps. The rapid "solidification" which occurs also reduces or eliminates sealant "squeeze out" i.e. the pushing out of sealant from a joint upon the introduction of e.g. a piece of glass or the like into a joint to which the glass is to be sealed and adhered by the sealant. "Squeeze out" of sealants in production lines often leads to the need for additional cleaning after product assembly. Contrary to the anticipated effects of the addition of components B & C which are immiscible with the reactive siloxane composition and therefore tend to migrate to the surface of the sealant thereby preventing good adhesion i.e. ultimate strength between the reactive siloxane sealant and substrates to which the sealant is being applied, excellent & durable adhesion was obtained on substrates such as glass, aluminium and also PVC, Polycarbonate, Polypropylene (flame treated or untreated) and other plastic substrates.

Hence, the resulting sealant product may be employed in a variety of applications, for example as coating, caulking and encapsulating materials. They are, however, particularly suitable for sealing joints, cavities and other spaces in articles and structures which are subject to relative movement. They are thus particularly suitable as glazing sealants, for sealing building structures & building materials such as concrete and stone, material assembly (e.g. bonding plastic substrates to other plastic materials, plastics to metal surfaces, plastic to glass bonding: such as PVC to glass in windows), metal to metal substrates and glass to glass substrates.

As previously discussed the sealant/adhesive in accordance with the present invention is designed to be applied at an elevated temperature in the form of a liquid or paste which then turns back to a solid immediately upon cooling product then begins curing to a permanent solid elastomer by reaction which atmospheric moisture and/or oxygen. Hence, the present invention combines the application properties of a hot melt product with its attendant rapid cooling to a solid which allows the immediate handling of two substrates which have been adhered together such as two panes of glass or a pane of glass to a plastic or metal spacer or the like in an insulating glass unit the sealant then cures chemically to provide a permanent elastomeric temperature resistant sealant which provides the structural integrity for the said insulating glass unit. It will be appreciated that in order for the sealant/adhesive of the present invention to function optimally on a macroscopic scale the sealant comprises a substantially homogeneous mix of component A with components B and/or C.

The composition in accordance with the present invention provides desired cure properties to provide good initial green strength upon initial application by means of the incorporation of either of components B and C alone but most preferably in combination with component A of the composition will cure in time upon exposure to moisture to provide a permanently cured, sealed joint between substrates, or other application. The resulting final cured product provides seals of sufficiently low modulus for most industry standards and an elongation to break, which is sufficiently high for most industry standards.

In a further embodiment of the invention there is provided method of forming an elastomeric mass between surfaces which is adherent to at least two such surfaces which method comprises introducing between the surfaces, at a temperature of between 40 and 150° C., a mass of a hot melt moisture curable composition in accordance with the present invention, capable of cure to an elastomeric body, the composition comprising:—

Component A. a siloxane polymer composition comprising
  a) An organopolysiloxane which may comprise not less than two groups selected from
    i) silicon bonded alkenyl groups or
    ii) silicon-bonded hydroxyl groups and/or silicon bonded hydrolysable groups
  b) one or more fillers;
  and a cure system comprising
  c) a suitable catalyst and where required
  d) a suitable cross-linker adapted to react with component A(a), catalysed with component A(c); and
either or both of components B. and C. wherein:—
  B. is one or more hot melt resins; and
  C. is one or more waxes having a melt temperature of between 40 and 200° C.; and/or an organic resin having a viscosity average molecular weight of from 200 to 6000 and a softening point of from 0° C. and 150° C.;
    wherein the total amount of components B and/or C in the composition is from 2 to 60% by weight of the whole composition.

Preferably Component A. is a siloxane polymer composition comprising
- a) an organopolysiloxane having not less than two silicon-bonded hydroxyl or hydrolysable groups;
- b) one or more fillers;
- c) a suitable condensation catalyst for curing component A and
- d) a silane substantially having the formula $G_x$-Si—$R_{4-x}$, wherein each group G is the same or different and is reactable with the hydroxyl or hydrolysable groups in (a), each R independently represents an alkyl group having from 1 to 10 carbon atoms, an alkenyl group, an alkynyl group an aryl group such as phenyl, or a fluorinated alkyl group and x is 2, 3 or 4.

Preferably, the hot melt adhesive/sealant is applied on to a substrate at an elevated temperatures in the range of 40 to 150° C. in the form of a liquid or paste which turns back to a solid immediately upon cooling providing an immediate green strength to the sealant prior to condensation curing of the siloxane constituent which in time cures to a permanent solid elastomeric sealant/adhesive. The irreversible condensation curing process commences immediately upon contact of the constituents of component A with the atmosphere/moisture but the majority of the irreversibly curing process of component A will take place at around or slightly above room temperature i.e. at a temperature in the region of from 5 to 35° C. In the case of the present invention whilst the external surface curing of the composition in the presence of moisture occurs in minutes/hours, the hardening of the bulk adhesive and subsequent permanent bonding to the surfaces by condensation curing of the siloxane component throughout the body of the applied adhesive/sealant as described in the present invention takes a few weeks to form but results in a surface which is smooth to the touch unlike traditional air-sealant interfaces which are comparatively tacky or sticky to the touch.

The present invention also extends to an elastomeric product comprising the moisture cured composition and the use of the hot melt composition as an adhesive and/or sealant.

A method of forming an elastomeric mass between surfaces which is adherent to at least two such surfaces which method comprises introducing between the surfaces a mass of a moisture curable composition and curing the composition in the presence of moisture.

The sealant of the present invention is designed to be applied at an elevated temperature in the form of a liquid or paste which then turns back to solid immediately upon cooling product then begins curing to a permanent solid elastomer by reaction which atmospheric moisture and/or oxygen. The present invention combines the application properties of a hot melt product with its attendant rapid cooling to a solid which allows the immediate handling of assemblies such as insulating glass units. The sealant then cures chemically to provide a permanent elastomeric temperature resistant sealant which provides the structural integrity of the assemblies concerned.

Preferably thermoplastic hot melt polymer and or wax (components B and C) either individually or jointly are present in sealant formulation in an amount of from about 2 to 60% by weight preferably 2 to 50% by weight.

Initial or green strength properties in the hot melt phase depend substantially on the type and quantity of the hot melt polymer and/or wax selected. However, compositions in accordance with the present invention show excellent green strength and ultimate strength adhesion on a variety of different substrates such as glass, aluminum, polyvinyl chloride (PVC), Polycarbonate, Polypropylene (flame treated or untreated) and other plastic substrates.

In order that the scope of the invention may become clearer there now follows a description of example sealant compositions selected for description to illustrate the invention by way of example. In the description all compositions are expressed by weight % and all viscosities are at 25° C. unless otherwise indicated.

EXAMPLES

In the following examples all values relating to the measurement of Green Strength were, unless otherwise indicated, determined in accordance with ASTM D3163. Hence to determine the green strength of the composition in accordance with the present invention the Lap shear strength was determined 3 minutes after sealant application using a pulling rate of 100 mm/min. Values for Lap shear strength and % of cohesive failure are recorded. Unless otherwise indicated samples tested were applied between two polycarbonate substrates when being tested in accordance with ASTM D3163.

Example 1

The same basic component A formulation was used for all samples in Example 1 this comprised:
100 parts by weight of dimethylhydroxy-terminated dimethylsiloxane polymer
8.1 parts by weight of methyltrimethoxysilane
121 parts by weight calcium carbonate
2.4 parts by weight of oleic acid (in-situ treating agent for filler)
3.8 parts by weight of diisopropoxytitanium bis(ethylacetoacetonate)
0.16 parts by weight of (ethylenediaminepropy)trimethoxysilane (adhesion promoter)

In Table 1 references to % weight of component A are referring to the % weight of the above composition as a whole which has been mixed with either plasticiser or component B to the amount indicated (to make up 100% weight of the composition) in Table 1. the plasticiser used was a trimethylsiloxy terminated dimethylsiloxane having a viscosity of 100 mPa·s at 25° C.

Samples were prepared using the following process:—
the or each hot melt resin (B) was heated until fluid and then are introduced into an organosiloxane polymer A(a) and mixed until homogeneous. Then the filler, component A(b), is introduced and mixed into the mixture. Finally a premix containing the remaining organosiloxane polymer (component A(a)), cross-linker (component A(d)), the cross-linker and component A(c) the catalyst, together with the adhesion promoter are added to complete the formulation. When component B is replaced by a plasticiser an initial mixture of organopolysiloxane and plasticiser is first prepared prior to incorporation of the filler and all subsequent steps are as described above.

Table 1 shows the green strength of component A with plasticiser and in combination with a variety of hot melt polymers (component B). Samples of dimensions 30 mm×30 mm×2 mm were prepared from the resulting mixtures and applied on to a polycarbonate substrate surface at a temperature of about 100° C. These samples were allowed to cool for a period of three minutes and then were analysed for their Lap shear Strength in accordance with ASTM D3163. Samples were pulled at a constant rate: 100 mm/min The hot melt resins utilised in Example 1 were as follows:
APO=Eastoflex® amorphous Polyolefin E1003 (a copolymer of propylene and ethylene having a thermoset viscosity of 300 mPa·s at 190° C.) from Eastman.

B10=Oppanol® B10 a polyisobutylene having a viscosity (at 25° C.) of 30 Pa·s and a molecular Weight (Mv) of 40000 (From BASF/Exxon)
B12=Oppanol® B12 a polyisobutylene having a viscosity (at 25° C.) of 150 Pa·s and a molecular Weight (Mv) of 55000 (From BASF/Exxon)

TABLE 1

| % weight of Component A | Plasticiser % weight | Component B | % weight Component B | Lap Shear strength (MPa) (Green Strength) | % Cohesive Failure on Polycarbonate |
|---|---|---|---|---|---|
| 90 | 10 | — | — | 0.0007 | 100 |
| 70 | 0 | B10 | 30 | 0.0050 | 100 |
| 90 | 0 | B10 | 10 | 0.0008 | 100 |
| 90 | 0 | B12 | 10 | 0.001 | 100 |
| 0 | 0 | B10 | 100 | 0.0228 | Not determined |
| 0 | 0 | B12 | 100 | 0.0350 | Not determined |
| 30 | 0 | B10 | 70 | 0.0153 | Not determined |
| 80 | 0 | B10 | 20 | 0.0034 | 100 |
| 80 | 0 | B12 | 20 | 0.0029 | 100 |
| 85 | 0 | B10 + APO | 10 + 5 | 0.0021 | 100 |
| 90 | 0 | APO | 10 | 0.0018 | 100 |
| 95 | 0 | APO | 5 | 0.0012 | 100 |

Most samples were analysed, visually for cohesive failure, to assess the adhesive nature of the sealant/adhesive between two polycarbonate samples used in the lap shear tests referred to above. This was achieved by visual inspection of the substrates after completion of the lap shear tests. Substrates which after having been pulled apart continued to have a complete coverage of sealant/adhesive on the side coated were deemed to have been subject of 100% cohesive failure in that adhesive/sealant remained in contact with substrate surface and as such the failure was entirely within the adhesive layer itself.

It will be seen that composition comprising only 10% by weight of hot melt resin gave only very slight improvements whereas in the presence of 15% or more hot melt resin the Lap Shear Strength was seen to improve significantly.

Example 2

In this example samples were prepared in the same manner as Example 1 with the exception that the waxes used were introduced into the mixture in a melted form simultaneously with, prior to or immediately after the hot melt resin (no preference or difference was noted, in results, due to the order of addition of components B and C when both were present in the composition. Unless otherwise indicated the formulations had the same constituents as used in Example 1, e.g. the plasticiser referred to in Table 2 was again trimethylsiloxy terminated dimethylsiloxane having a viscosity of 100 mPa·s at 25° C. Example 2 shows the surprising effects of using both a variety of waxes and polyisobutylene in a sealant/adhesive in accordance with the present invention. The same testing regime was used as in Example 1 and it will be appreciated that an enhanced green strength is obtained in the hot melt sealant/adhesive (HMS) by the addition of all the waxes when added in combination with Oppanol® B10 polyisobutylene. The compositions used throughout example 2 are identified in Table 2a.

TABLE 2A

| Reagent | Type | HMS (wt %) | R1 (wt %) | R2 (wt %) | Comp. |
|---|---|---|---|---|---|
| Polymer | Dimethylhydroxy-terminated dimethylsiloxane (50000 mPa·s at 25° C.) | 35.50 | 35.50 | 41.12 | 37.8 |
| Plasticiser | | | | | 10.1 |
| Component B Resin | Oppanol ® B10 | 10.00 | 12.50 | 10.00 | |
| Wax | | 2.50 | 0.00 | 0.00 | |
| Calcium Carbonate ppt. | Socal ® 312N (from Solvay SA) | 47.00 | 47.00 | 45.00 | 48.4 |
| Cross-linker | iso-butyltrimethoxysilane | 3.00 | 3.00 | 2.80 | 2.70 |
| Adhesion promoter | | 1.00 | 1.00 | 0.08 | 0.09 |
| Catalyst | Diisopropoxytitanium Bis(Ethylacetoacetate) | 1.00 | 1.00 | 1.00 | 0.9 |
| Total (%) | | 100 | 100 | 100 | 100 |

The adhesion promoter used throughout example 2 was the reaction product/mixture of aminopropyltrimethoxysilane, glycidoxypropyltrimethoxysilane and methyltrimethoxysilane. A variety of commercially available waxes were tested, and the general chemical types as defined by the suppliers are provided in Table 2b. The green strength of the resulting sealants/adhesives in accordance with the present invention are provided as Lap shear strength measurements in Table 2b together with the variety of waxes tested. As indicated in Table 2a 2.5% by weight of the waxes described in Table 2b were introduced into the composition.

The Likowax® and Licocene® trademarks are owned by Clariant SA. The Crayvallac® trademark is owned by Cray Valley and the Radia® trademark is owned by Oleon.

TABLE 2B

| Wax | Wax type | Lap Shear strength (MPa) |
|---|---|---|
| R1 (Resin only) | | 0.0045 |
| R2 (Resin only) | | 0.0039 |
| Comp (no resin or wax) | | 0.0009 |
| Likowax ® PE 890 | EVA modified PE wax | 0.0048 |
| Likowax ® 521 granules | Partially saponified ester waxes-Montan Acid mixed esters | 0.0053 |
| Crayvallac SLX | micronised amide wax | 0.0059 |
| Likowax ® KPS flakes | Ester made with monofunctional alcohols | 0.0060 |
| Licocene ® PP Si 3262 | polypropylene wax trimethoxysilane grafted (10-12%) | 0.0064 |

TABLE 2B-continued

| Wax | Wax type | Lap Shear strength (MPa) |
|---|---|---|
| Likowax ® KST | Ester of montanic acid with multifunctional alcohols, methyl ester | 0.0067 |
| Likowax ® KSL flakes | Montan wax, acids, esters with ethylene glycol | 0.0083 |
| Radia ® 7500 | Cetyl palmitate | 0.0084 |
| Likowax ® F | Montanwax octadecyl alcohol monoester, fatty acids, ethyl ester | 0.0098 |
| Likowax ® O Flake | Partially saponified ester waxes | 0.0168 |

It will be appreciated that whilst the addition of hot melt resins alone gave a significant increase over the comparative, surprisingly the combination of wax and hot melt resin gave a significantly greater Lap shear strength result three minutes after application of the sealant (i.e. green strength).

Lap shear measurements were also carried out two weeks after application of the sealant, according to ASTM D3163, to determine the ultimate strength of the cured sealant/adhesive. A variety of substrates were used to show the versatility of compositions in accordance with the present invention. The different combinations are indicated in Table 2c. A pulling speed of 100 mm/min was utilised and Ultimate strength values of between 0.9 and 1.5 MPa were measured. Furthermore the durability of the cured sealant was observed by using HMS formulation in table 2a with 1% of Likowax® F. The sealant/adhesive was first cured for a period of two weeks from initial application between two polycarbonate substrates and was then aged for a period of a further one week immersed in water at 70° C., (i.e. at 100% relative humidity (RH)) before the cohesive failure was again carried out according to ASTM D3163. Results are presented in Table 2c.

TABLE 2C

| Lap shear type | Lap shear strength (Ultimate Strength) (MPa) | Elongation at Break (%) (ASTM D412-98a) | Modulus at 100% elongation (MPa) (ASTM D638-97) | Cohesive failure on substrate (%) | Cohesive failure after 1 week (70° C., 100% RH) |
|---|---|---|---|---|---|
| PC/GL | 1.230 | 510 | 0.50 | 100 | 100 |
| PC/PP$_{fl}$ | 1.017 | 450 | 0.44 | 100 | 100 |
| PC/PA | 1.001 | 475 | 0.42 | 100 | 100 |
| AL/GL | 1.023 | 410 | 0.40 | 100 | 100 |

PC = Polycarbonate
PA = Polyamid 6/6
PP$_{fl}$ = flamed treated polypropylene
GL = Glass
AL = Aluminium mill finish Example 3

A series of additional test were carried with different sealant formulations to show the surprising improvements in green strength achieved through the combination of a hot melt polymer (polyisobutylene) and a wax (Likowax® F) in sealant formulations. Again, in this example samples were prepared in the same manner as Example 1 with the exception that the waxes used were introduced into the mixture in a melted form simultaneously with, prior to or immediately after the hot melt resin (no preference or difference was noted, in results, due to the order of addition of components B and C when both were present in the composition. Details of the formulations used are shown in Table 3a below with composition details provided in grams (g):—

TABLE 3A

| Sample | i | ii | iii | iv | v | vi | vii | viii |
|---|---|---|---|---|---|---|---|---|
| Dimethyl-hydroxy-terminated dimethylsiloxane (50000 mPa·s at 25° C.) | 52.94 | 47.47 | 42.00 | 36.54 | 0 | 0 | 0 | |
| Dimethyl-hydroxy-terminated dimethylsiloxane (20000 mPa·s at 25° C.) | 0 | 0 | 0 | 0 | 52.94 | 47.47 | 42.00 | 36.54 |
| Oppanol ® B10 | 12.00 | 12.00 | 24.00 | 24.00 | 12.00 | 12.00 | 24.00 | 24.00 |
| Likowax ® F | 0.00 | 6.00 | 0.00 | 6.00 | 0.00 | 6.00 | 0.00 | 6.00 |

TABLE 3A-continued

| Sample | i | ii | iii | iv | v | vi | vii | viii |
|---|---|---|---|---|---|---|---|---|
| SOCAL® 312N precipitated CaCO$_3$ | 49.80 | 49.80 | 49.80 | 49.80 | 49.80 | 49.80 | 49.80 | 49.80 |
| (ethylenediaminepropy)trimethoxysilane | 0.09 | 0.09 | 0.09 | 0.09 | 0.09 | 0.09 | 0.09 | 0.09 |
| Methyltrimethoxysilane | 3.82 | 3.42 | 3.03 | 2.64 | 3.82 | 3.42 | 3.03 | 2.64 |
| Diisopropoxytitanium Bis(Ethylacetoacetate) in methyltrimethoxysilane (80/20 ratio) | 1.35 | 1.21 | 1.07 | 0.93 | 1.35 | 1.21 | 1.07 | 0.93 |
| Total Weight (g) | 120 | 120 | 120 | 120 | 120 | 120 | 120 | 120 |
| Lap Shear strength (MPa) | 0.0023 | 0.0252 | 0.0053 | 0.0518 | 0.0005 | 0.0595 | 0.005 | 0.0525 |

Example 4

In this example compositions identified in Table 4a were prepared as described in Example 3. After preparation a sample of sealant of substantially constant thickness was applied to a polycarbonate substrate surface and was allowed to cool to generate the initial green strength and then cure for 1 week at room temperature to ensure that the ultimate strength of the cured sealant had been obtained. At the end of the aforementioned one week period the sealant surface was painted and allowed to dry at room temperature. The integrity of the resulting painted sealant was assessed after both four and fifteen days from the application of the paint. Paint (1), as identified in Table 6b, was a commercial acrylic water-based paint known as "Levis Colores del Mundo: laque satinee extra couvrante Bali vert pure 5309". Paint (2) as identified in Table 6b was a commercial paint comprising a satin gloss enamel on alkyldurethane base and is known as was "Levis: laque satinee de haute qualite Vert empire 5834"

TABLE 4A

| Ingredients | 1 (wt %) | 2 (wt %) | 3 (wt %) | 4 (wt %) | Comparison |
|---|---|---|---|---|---|
| Dimethylhydroxy-terminated dimethylsiloxane (50000 mPa · s at 25° C.) | 38.42 | 38.42 | 41.12 | 46.12 | 38.42 |
| Oppanol® B10 | 14 | 14 | 10 | 0 | 0 |
| Dow Corning® AMS-C30 Cosmetic Wax | 2.5 | 0 | 0 | 0 | 0 |
| Licowax® F | 0 | 2.5 | 0 | 5 | 0 |
| trimethylsiloxy terminated dimethylsiloxane having a viscosity of 100 mPa · s at 25° C. | 0 | 0 | 0 | 0 | 16.5 |
| Precipitated CaCO$_3$ (Socal 312N) | 41.3 | 41.3 | 45 | 45 | 41.3 |
| Isobutyltrimethoxysilane | 2.7 | 2.7 | 0 | 0 | 2.7 |
| Methyl trimethoxysilane | 0 | 0 | 2.8 | 2.8 | 0 |
| (ethylenediaminepropy)trimethoxysilane | 0.08 | 0.08 | 0.08 | 0.08 | 0.08 |
| Diisopropoxytitanium Bis(Ethylacetoacetate | 1 | 1 | 1 | 1 | 1 |

The standard crosshatch test was utilised to assess the integrity, i.e. the adhesion of the paint to the sealant surface. Prior to testing a crosshatch was prepared using a scalpel on the painted cured sealant surface. This provides the viewer with a grid of preferably 100 small sections. Two types of adhesive tape, ASTM 03359 and ISO 2409, were applied to different samples or different areas of the same sample. The tapes were then removed to determine which, if any paint was poorly adhered to the sealant surface. This was achieved by studying the adhesive on the tape to determine whether or not any paint had been transferred to the adhesive from the substrate surface. As will be seen in Table 4b below no paint remained on either tape when the composition comprised both the component B resin and Component C wax (samples 1 and 2) or component C wax alone (sample 4). However, paint remained on the adhesive tape when applied to a cured sample 3 (containing component B resin only) using acrylic paint 1 but was fine using paint 2. As expected the comparative 100% silicone based sealant (comp) gave significantly worse results than any of the other compositions.

TABLE 4B

| Trials | Paint [1] found on tape | Paint [2] found on tape |
|---|---|---|
| 1 | None | None |
| 2 | None | None |
| 3 | Yes | None |
| 4 | None | None |
| Comp. | Yes | Yes |

Example 5

The following example shows that the green strength of compositions (indicated as previously discussed in terms of Lap Shear Strength measured 3 minutes after application) is also enhanced when the wax in examples 2 to 4 is replaced with a low molecular weight resin in the hot melt sealant/adhesive (HMS). The general compositions prepared are indicated in Table 5a and the specific resins used are depicted in table 5b. The samples were prepared in the same manner as Example 1 with the exception that the low molecular weight resin (LMW resin) and the Oppanol® B10 polyisobutylene are pre-blended before being introduced into the mixture in a melted form. The same testing regime was used as in Example 1.

TABLE 5A

| Reagent | Type | HMS (wt %) | Reference (no organic resin) |
|---|---|---|---|
| Polymer | Dimethylhydroxy-terminated dimethylsiloxane (50000 mPa · s at 25° C.) | 36.51 | 37.8 |
| Plasticiser | | | 10.1 |
| Component B Resin | Oppanol ® B10 | 6.00 | |
| LMW resin | | 4.00 | |
| Calcium Carbonate ppt. | Socal ® 312N (from Solvay SA) | 48.34 | 48.4 |
| Cross-linker | isobutyltrimethoxysilane | 3.09 | 2.70 |
| Adhesion promoter | | 1.03 | 0.09 |
| Catalyst | Diisopropoxytitanium Bis(Ethylacetoacetate) | 1.03 | 0.9 |
| Total (%) | | 100 | 100 |

The adhesion promoter used throughout Example 5 was the same as Example 2. The commercially available resins tested are provided in table 5b. The lap shear strength of compositions as defined in Table 5a containing 4% by weight of LM weight resins are provided in Table 5b.

The low molecular weight resins were purchased from Eastman. The Kristalex®, Piccotex® and Regalite® trademarks are owned by Eastman.

TABLE 5B

| LM weight resins | Resins type | Lap Shear strength (MPa) |
|---|---|---|
| Reference | (No component B or C) | 0.0009 |
| Kristalex ® F85 | Pure monomer hydrocarbon resin based on purified 8-9 carbon aromatic monomers | 0.0067 |
| Piccotex ® TM75 | hydrocarbon resin made from mixed purified aromatic materials | 0.0070 |
| Regalite ® R1100 | Hydrogenated hydrocarbon resins made from aliphatic (C5), aromatic (C9), or dicyclopentadiene (DCPD) | 0.0061 |

Example 6

In order to exemplify the use of a hydrosilylation cure system as component A, a commercial hydrosilylation cure adhesive was utilised (Dow Corning® 866 Primerless Adhesive). Samples were prepared using the following process the resin/wax (Oppanol® B10 polyisobutylene/Licowax® F) pre-blend (90% component B and 10% component C) was heated to reduce viscosity and then introduced into an initial mixture of component A.

TABLE 6A

| Reagent | HMS 1 (wt %) | HMS 2 (wt %) | HMS 3 (wt %) | Comp. A (no organic resin(wt %)) |
|---|---|---|---|---|
| Hot melt Pre-Blend | 10 | 20 | 30 | 0 |
| Dow Corning ® 866 Primerless Adhesive | 90.0 | 80.0 | 70.0 | 100 |

The lap shear strengths of compositions as defined in Table 6a containing different percentage of pre-blend resin/wax are measured following the same process as described in Example 1. The same measures are performed on completely cured material to observe the failure on substrates (aluminium in this case). Table 6b summarizes results obtained and shows the improvement on green strength measured on lap shears.

TABLE 6B

| Sample | Lap Shear Strength (MPa) (Green Strength) | Lap Shear Strength (MPa) (Ultimate Strength) | % Cohesive Failure on Polycarbonate |
|---|---|---|---|
| Comp. A | 0.0001 | >2.5 | 100 |
| HMS 1 | 0.0003 | >2.5 | 100 |
| HMS 2 | 0.0008 | >2.5 | 100 |
| HMS 3 | 0.002 | >2.5 | 100 |

The invention claimed is:

1. A hot melt sealant/adhesive composition containing:
   A. component A: a siloxane polymer composition comprising
   a) an organopolysiloxane which comprises not less than two groups selected from
      i) silicon-bonded alkenyl groups or
      ii) silicon-bonded hydroxyl groups and/or silicon-bonded hydrolysable groups
   b) one or more fillers;
   and a cure system comprising
   c) a suitable catalyst and where required
   d) a suitable cross-linker adapted to react with component (a), catalysed with component (c); and
   both of components B and C wherein:
   B. is one or more hot melt resins having a $T_g$ of less than 25° C.; and
   C. is one or more waxes having a melt temperature of between 40 and 200° C.; and an organic resin different from component B and having a viscosity average molecular weight of from 200 to 6000 and a softening point of from 0° C. and 150° C.;
   wherein the total amount of components B and C in the composition is from 2 to 60% by weight of the whole composition.

2. A hot melt sealant/adhesive composition in accordance with claim 1 characterised in that component A is a siloxane polymer composition comprising
   a) an organopolysiloxane having not less than two silicon-bonded hydroxyl or hydrolysable groups;
   b) one or more fillers;
   c) a suitable condensation catalyst for curing component A and
   d) a silane substantially having the formula $G_x$-Si—$R_{4-x}$, wherein each group G is the same or different and is reactable with the hydroxyl or hydrolysable groups in (a), each R independently represents an alkyl group having from 1 to 10 carbon atoms, an alkenyl group, an alkynyl group, an aryl group, or a fluorinated alkyl group and x is 2, 3 or 4.

3. A hot melt sealant/adhesive composition in accordance with claim 2 wherein component A(c) is a titanium, tin or zirconium based condensation catalyst.

4. A hot melt sealant/adhesive composition in accordance with claim 1 wherein component A(a) has the general formula $$J\text{-}Q\text{-}J^1$$

where J and $J^1$ are independently selected from siloxane groups which terminate in hydroxyl or hydrolysable groups selected from —$Si(OH)_3$, —$(R^a)Si(OH)_2$, —$(R^a)_2SiOH$, —$R^aSi(OR^b)_2$, —$Si(OR^b)_3$, —R$^a_2$SiOR$^b$ and —R$^a_2$Si—R$^c$—SiR$^d_p$(OR$^b$)$_{3-p}$ where each R$^a$ independently represents a monovalent hydrocarbyl group, each R$^b$ and R$^d$ group is independently an alkyl or alkoxy group in which the alkyl groups have up to 6 carbon atoms; R$^c$ is a divalent hydrocarbon group interrupted by one or more siloxane spacers having up to six silicon atoms; and p has the value 0, 1 or 2; and Q is a polydiorganosiloxane chain containing multiple siloxane units of the formula R"$_s$SiO$_{4-s/2}$ in which each R" independently represents an alkyl group having from 1 to 10 carbon atoms, an alkenyl group; an aryl group, or a fluorinated alkyl group and has a value of 0, 1 or 2.

5. A hot melt sealant/adhesive composition in accordance with claim 1 wherein component A(b) comprises one or more fillers selected from the group of fumed silica, calcined silica, precipitated silica, titania, zinc oxide, clay, mica, precipitated and/or ground calcium carbonate, magnesium carbonate, quartz, diatomaceous earth, barium sulphate, wollastonite, pyrophylite, kaolin and calcium sulphate.

6. A hot melt sealant/adhesive composition in accordance with claim 1 wherein component B comprises one or more of the following, polyolefins, polyvinyl acetate, hydrocarbon resins, hydrogenated aromatic pure monomer hydrocarbon resins, asphalts, bitumens, paraffins, crude rubbers, fluorinated rubbers, fluorocarbons, polystyrenes, cellulosic resins, acrylic resins, styrene butadiene resins, polyterpenes, ethylene propylene diene monomer (EPDM), and mixtures and/or derivatives thereof.

7. A hot melt sealant/adhesive composition in accordance with claim 6 wherein component B is selected from reactive or unreactive polyethylenes, polypropylenes, polybutylenes and polyisobutylenes.

8. A hot melt sealant/adhesive composition in accordance with claim 1 wherein component C comprises one or more of montanic acid esters, esters of montanic acid with multifunctional alcohols, partly saponified bright ester waxes, montan wax, micronised and non-micronised polyalkylene waxes, oxidised polyethylene waxes, micronised amide waxes, waxes comprising esters of monofunctional alcohols, saponified and/or partially saponified waxes, mixed esters of montan wax, cetyl palmitate, micronised polyethylene waxes, ethylene homopolymer waxes, ethylene copolymer waxes, partially saponified montanic ester waxes, ethyl vinyl acetate modified polyethylene waxes, polypropylene waxes, modified polypropylene waxes, montan wax acids, esters of ethanediol, and/or glycol montanate.

9. A process for the preparation of a condensation curable composition in accordance with claim 1 comprising the steps of
(i) preparing a slurry of components A(c) and A(d), and any optional additives
(ii) mixing the slurry with 40 to 75%, of component A(a) or an initial mixture of A(a)
(iii) adding and mixing with the filler (component A(b)) and subsequently the remainder of the polymer;
(iv) adding component B and C as hot low viscosity fluid(s) at a temperature of at least 50° C. and mixing component B and C into component A until homogeneous.

10. A process for the preparation of a condensation curable composition in accordance with claim 1 comprising the steps of
(i) heating component B and C and introducing them, as low viscosity fluid(s) at a temperature of at least 50° C., into the majority of component A(a) or an initial mixture of A(a) and mixing until homogeneous,
(ii) introducing and mixing component A(b) into the mixture in (i), and
(iii) introducing a premix containing the remaining component A(a), component A(d), the cross-linker and component A(c) together with any optional additives to complete the composition.

11. A process for the preparation of a condensation curable composition in accordance with claim 1 comprising the steps of
(i) introducing component A(b) into the majority of component A(a) or an initial mixture of A(a) and mixing until homogeneous
(ii) introducing a premix containing the remaining component A(a), component A(c), and A(d) together with any optional additives to complete component A,
(iii) introducing component B and component C as low viscosity fluid(s) at a temperature of at least 50° C. into component A and mixing to homogeneity.

12. A method of forming an elastomeric mass between surfaces which is adherent to at least two such surfaces which method comprises introducing between the surfaces, at a temperature of between 40 and 150° C., a mass of a hot melt moisture curable composition in accordance with claim 1, capable of cure to an elastomeric body and curing said composition in the presence of moisture.

13. A cured elastomeric product of the method of claim 12.

14. A product in accordance with claim 13 coated with at least one coat of paint.

15. An elastomeric body in accordance with claim 13 having a surface with an at least partial coating of solvent based paint.

16. An elastomeric body in accordance with claim 13 wherein the elastomeric body is a joint sealant, an adhesive, a moulded body, a coating or a formed-in-place gasket.

17. A paintable cured elastomeric product prepared in accordance with the method of claim 12.

18. A hot melt sealant/adhesive composition in accordance with claim 1 wherein component C comprises one or more resins having viscosity average molecular weight of from 200 to 6000 comprising aliphatic and/or aromatic hydrogenated hydrocarbon resins, aliphatic and/or aromatic pure monomer hydrocarbon resins, polyalkylene resins, and aromatic pure styrene hydrocarbon resins.

19. A method of producing a cured silicone elastomer with a surface coated with a hardened protective coating comprising, exposing a composition in accordance with claim 1 to moisture until a cured elastomeric surface is obtained and a homogeneous dull surface develops, thereafter applying a protective coating composition, hardenable at ambient conditions, over at least a portion of the cured elastomeric surface where the protective coating composition wets the surface to which it is applied and produces an essentially flaw-free film and, thereafter, allowing the protective coating composition to harden.

* * * * *